United States Patent [19]

Martin

[11] Patent Number: 4,746,852
[45] Date of Patent: May 24, 1988

[54] CONTROLLER FOR BATTERY CHARGER

[75] Inventor: Ray J. Martin, Lawndale, Calif.

[73] Assignee: Christie Electric Corp., Torrance, Calif.

[21] Appl. No.: 771,824

[22] Filed: Sep. 3, 1985

Related U.S. Application Data

[63] Continuation-in-part of Ser. No. 665,924, Oct. 29, 1984, abandoned.

[51] Int. Cl.$^4$ .................... H02J 7/04; H01M 10/44
[52] U.S. Cl. .................................... 320/20; 320/14; 320/21; 320/31; 320/39
[58] Field of Search ............... 320/20, 21, 39, 40, 320/14, 31; 328/132

[56] References Cited

U.S. PATENT DOCUMENTS

| | | | |
|---|---|---|---|
| 3,597,673 | 8/1971 | Burkett et al. ............... | 320/21 X |
| 4,006,396 | 2/1977 | Bogut ........................ | 320/35 X |
| 4,134,056 | 1/1979 | Fukui et al. ................ | 320/20 |
| 4,213,081 | 7/1980 | Taylor ........................ | 320/20 X |
| 4,354,148 | 10/1982 | Tada et al. .................. | 320/20 |
| 4,385,269 | 5/1983 | Aspinwall et al. ............ | 320/20 X |
| 4,388,582 | 6/1983 | Saar et al. .................. | 320/20 |
| 4,503,378 | 3/1985 | Jones et al. ................. | 320/20 |
| 4,639,655 | 1/1987 | Westhaver et al. ............ | 320/14 |

Primary Examiner—R. J. Hickey
Attorney, Agent, or Firm—Harris, Kern, Wallen & Tinsley

[57] ABSTRACT

A controller for a battery charger terminates battery charging operation as a function of a time derivative of measured battery voltage. The controller has analog and digital embodiments. A controller with means for determining a time derivative of the measured battery voltage, determining a change in slope of the time derivative, and using said change in slope as a control function for the battery charger.

7 Claims, 12 Drawing Sheets

WHERE:

= LODAC EQUIVALENT OF THIS HIDAC LSB CHANGE

= HIDAC VALUE

= ADDITION PATH NECESSARY TO EQUATE THIS HIDAC VALUE TO LODAC QUANTITIES

FIG. 13

DATA BUS : EIGHT-BIT PATH FOR CONTROLLING DAC'S

STATUS LINE : YES/NO INDICATION THAT THE D/A OUTPUT IS GREATER THAN THE BATTERY INPUT

CONTROL LINES : USED TO ACTUATE S&H SWITCHES 40a AND 40b

| INDEX | TABLE* |
|---|---|
| 0 | 2 |
| 1 | 0 |
| 2 | 4 |
| 3 | 3 |
| 4 | 0 |
| 31 | 17 |

1 X 32 BYTE ORGANIZATION

FIG. 19

24 X 20 BYTE ORGANIZATION

CONTROLLER FOR BATTERY CHARGER

CROSS REFERENCE TO RELATED APPLICATION

This application is a continuation-in-part of application Ser. No. 665,924, filed Oct. 29, 1984, now abandoned.

BACKGROUND OF THE INVENTION

This invention applies to a controlled means for charging nickel-cadmium (NICAD) batteries. The controller circuitry can operate in either analog or digital mode. A feature of the digital mode is increasing accuracy in defining control action. Additionally, a unique scaling technique is used in the digital process.

Conventional Charging Processes for NICAD Batteries

Constant potential can be applied with various approaches to controlling the amount of current over the several hours required to achieve a high percentage of full charge. Alternatively, constant current can be applied, usually, for an even longer period of time.

Each technique involves several problems. Besides taking a long period of time to recharge, the variations of cells cause some to be overcharged, while attempting to bring lower capacity cells up.

The battery plates can be polarized. Gas bubbles (electrolysis) can form on the plates. These effects will cause battery temperature to rise, increasing polarization and bubble formation until the battery becomes overheated and explodes. Heating by less severe rates of charge will cause the electrolyte to vent, and this causes the battery to lose capacity.

To reduce these problems, charging can be pulsed on and off. The length of pulse time is controlled to reduce the buildup of polarization and bubble formation. The total charge time is reduced, and there is less deterioration due to lower polarization and electrolysis.

Figure 1:
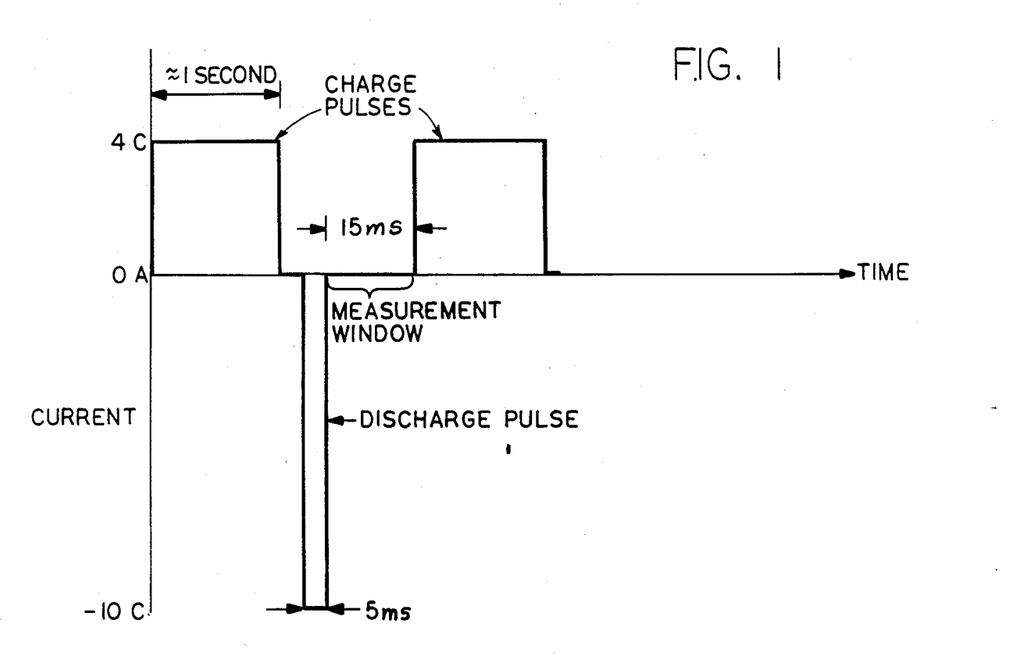
FIG. 1 is a timing diagram illustrating the operation of a battery charger with charge and discharge pulses.

Christie Electric Corp. has developed a refined pulse charger wherein after each charging pulse, a short-length discharge pulse is applied to negate polarization and electrolysis (FIG. 1). This technique provides a complete charge in a few minutes to one hour, instead of the several hours required for other techniques. The effectiveness of this approach is further shown by the typical 0°-7° C. temperature rise. Battery chargers of this type are shown in U.S. Pat. Nos. 3,517,293; 3,559,025; 3,597,673; 3,609,503; 3,614,582; 3,614,583; 3,614,584; and 3,617,851.

Figure 2A:
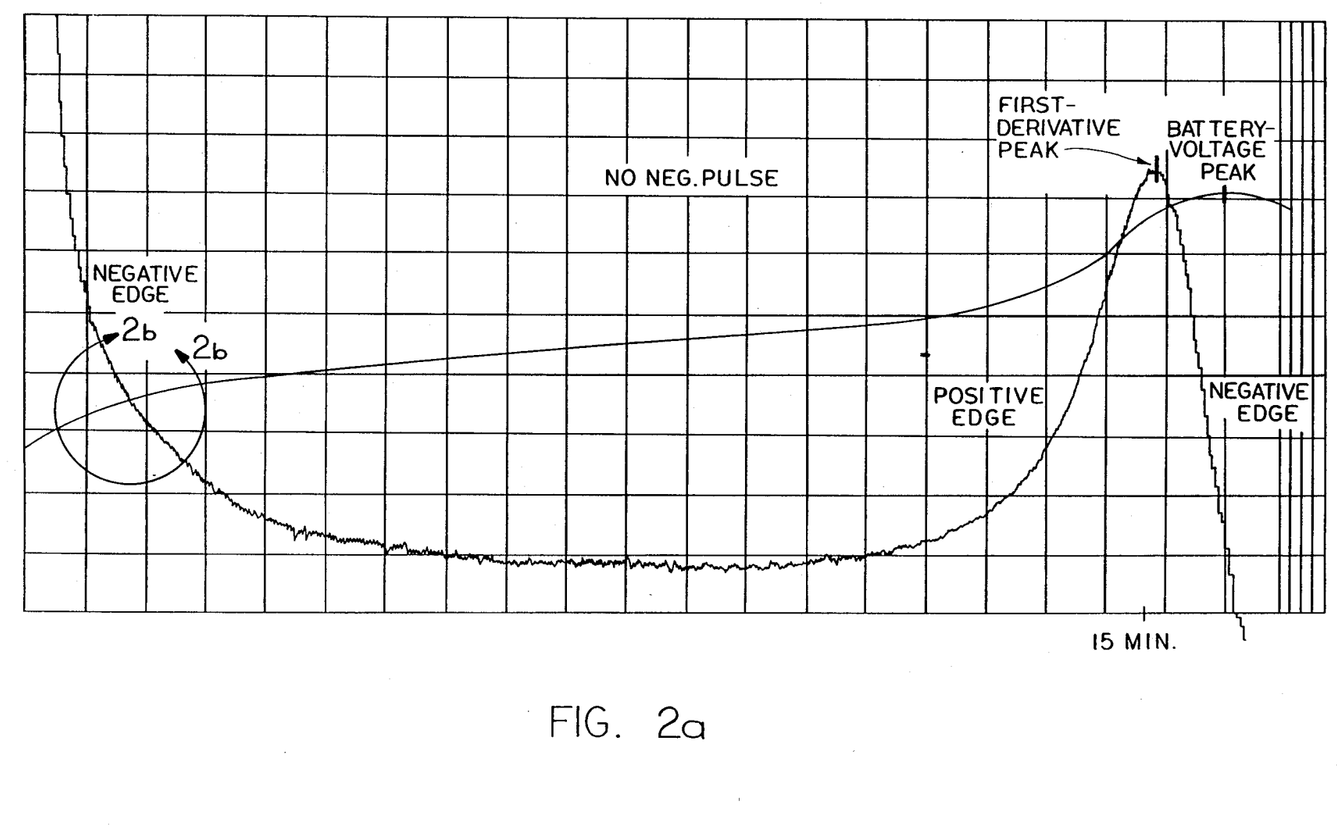
FIG. 2a is a plot of battery voltage versus time during a battery charging operation, with an additional curve comprising the first derivative of the voltage versus time curve.

In order to determine when to terminate charging, measurements of the battery charge are made in the "OFF" period or measurement window between discharge and charge pulses. Several approaches are employed to determine when to cease charging the battery. One is to measure the output voltage of the battery until it reaches a certain value and then, at that time, cause the charger to cease charging. As can be seen in FIG. 2a, the typical voltage during charging actually continues to rise later in the charging cycle. Therefore, to be certain of a full charge on the battery, it is difficult to select a voltage which will apply to all battery cells due to their variations one to another. Another technique is to charge the battery until a negative slope is detected. The problem with this approach is that, in order to reach this point, the battery must be overcharged, and this causes excessive heating in the battery.

Another approach is to again reach a specific voltage, and then apply the charging process for a specific length of time before shutting down. This will give a more complete charge to the battery. But again, this is dependent on an absolute value that is insensitive to battery conditions.

Accordingly, it is an object of the present invention to provide a new and improved controller for battery chargers which determines a time derivative of actual battery voltage and a change in slope of the time derivative, and uses this determined change in slope for shutting off the battery charger operation. Other objects, advantages, features and results are detailed more fully in the course of the following description.

SUMMARY OF THE INVENTION

Figure 2B:
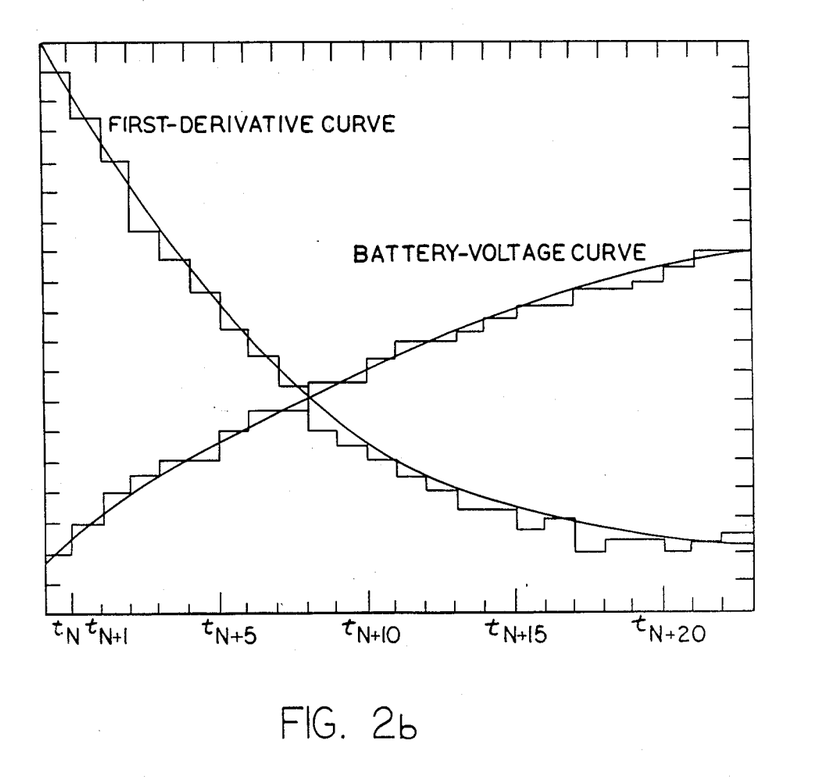

As can be seen in FIGS. 2a and 2b, if one takes the first derivative of the battery voltage, a curve can be generated showing when the charging rate begins to fall off due to the battery becoming more fully charged. The first derivative of the charge rate will also be changing its slope much more rapidly by virtue of the first derivative processing; thus, a determination can be more accurately measured by the changes of slope of the first derivative curve.

The static amplitude of the battery voltage curve is affected by the number of cells in a pack as well as by battery temperature (except when very cold, e.g. about 0° C.) and age, etc. An added benefit of using the first derivative approach is that, since the first derivative of a constant is zero, these effects are ignored; thus, the charge termination circuitry is allowed to concentrate on more pertinent parameters.

The battery charger controller of the invention includes means for measuring the voltage of the battery to provide a measured voltage, means for determining a time derivative of the measured voltage to provide a voltage derivative, typically a first time derivative, means for determining a change in the slope of the voltage derivative, typically a change in sign of the slope, and means for shutting off the charger as a function of the change in slope, typically, at the time the change in sign occurs or at a predetermined time after the change in sign occurs.

BRIEF DESCRIPTION OF THE DRAWINGS

FIG. 2b is an expanded view of a portion of the plots of FIG. 2a;

DESCRIPTION OF THE PREFERRED EMBODIMENTS

Analog Embodiment

Figure 3:
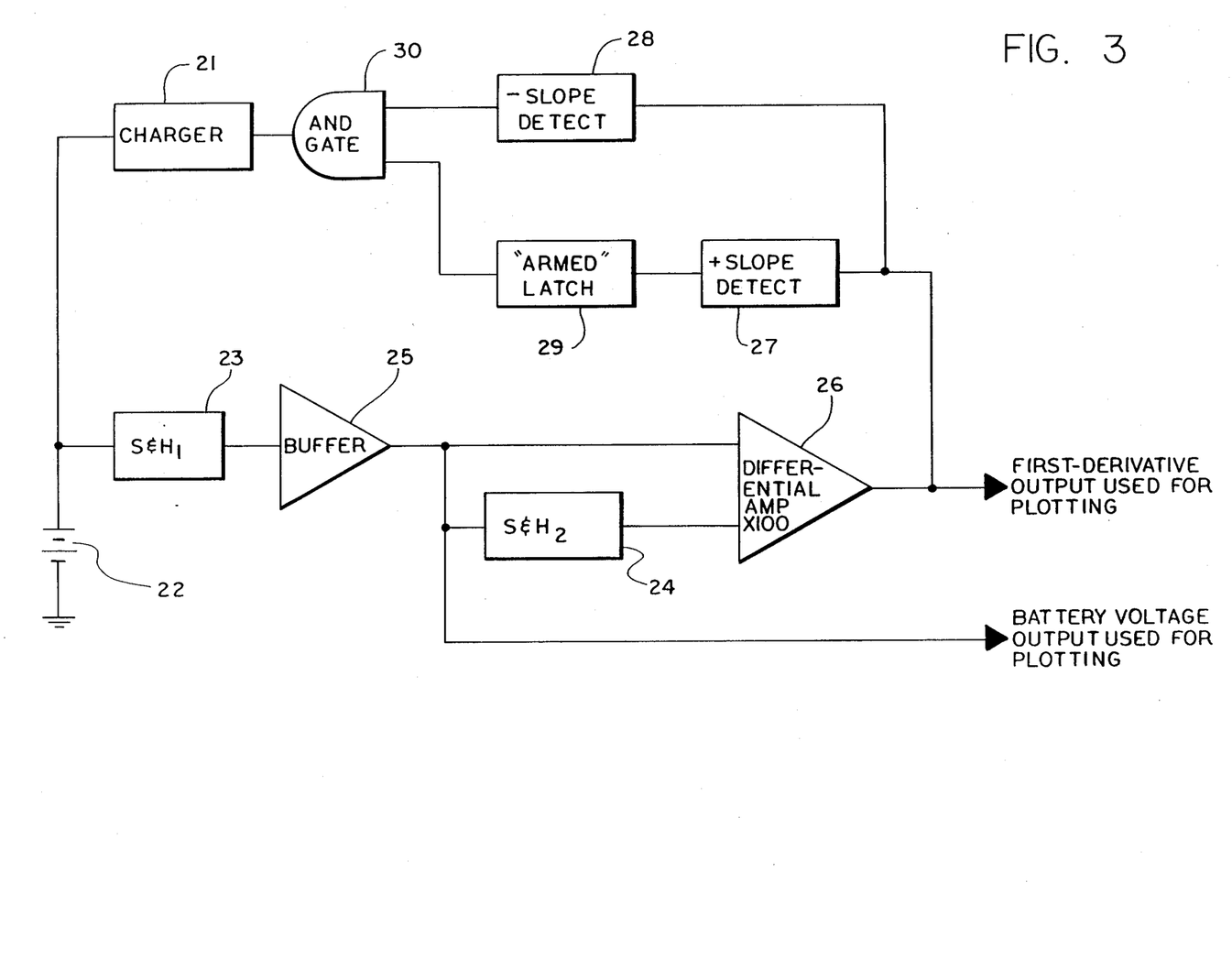
FIG. 3 is a block diagram of an analog controller for a battery charger and incorporating an embodiment of the present invention.

One of the two approaches disclosed in this application is to employ an analog technique of determining the slope change. FIG. 3 illustrates the circuit elements of an amplitude slope detection system for use with a battery charger 21 and a battery 22. The circuit includes sample and hold units (S&H) 23,24, a buffer amplifier 25, a differential amplifier 26, a positive slope detector 27, a negative slope detector 28, an "armed" latch 29, and an "and" gate 30.

The charger 21 may be conventional and provides both for charging and discharging of batteries. The first sample and hold 23 stores a voltage and the second one 24 is used to compare the latest sample voltage versus previous sampling so as to determine when the charge rate is increasing, leveling off, or has started to decrease. As the first derivative curve is being generated, the key to terminating charge is to first recognize a positive going edge of the first derivative curve in the detector 27. This then "arms" the negative edge detector 28, which then terminates charge on the next negative going edge. A significant advantage in using this type of indicator is that the rate of charge is determined by the battery itself, rather than a predetermined voltage that is not uniform for all battery cells.

This technique of comparing the sampled output voltage utilizing an analog comparison is an improvement over other determining systems. As described, its degree of accuracy depends on the rate at which the samples are taken to determine when full charge has been obtained. Faster sampling rates could be taken to increase accuracy, but this would penalize the charging pulse width accordingly. It is desirable that actual charge termination occur before the battery voltage curve begins to slope negatively. Experience indicates that, during the time after the first derivative peak has occurred, considerably more of the energy being put into the battery generates heat rather than usable capacity. Thus, to obtain greater accuracy and define rate of slope change, higher order derivative curves can be generated, as compared to the first order ones described. Each higher order processing will give a greatly sharpened change of slope definition.

When multiple batteries are connected, as in a pack, there is a unique profile of the charging characteristics and derivative curves. This data can be stored for use in controlling the charge cycle.

A system of identifying various signatures is a part of the implementation of the invention so that the user does not have to reset the controller for each battery type or condition. Additionally, when a battery or pack is discharged considerably or might be quite cold, it can be so identified for proper action of the controller.

Digital Embodiment

Figure 4:
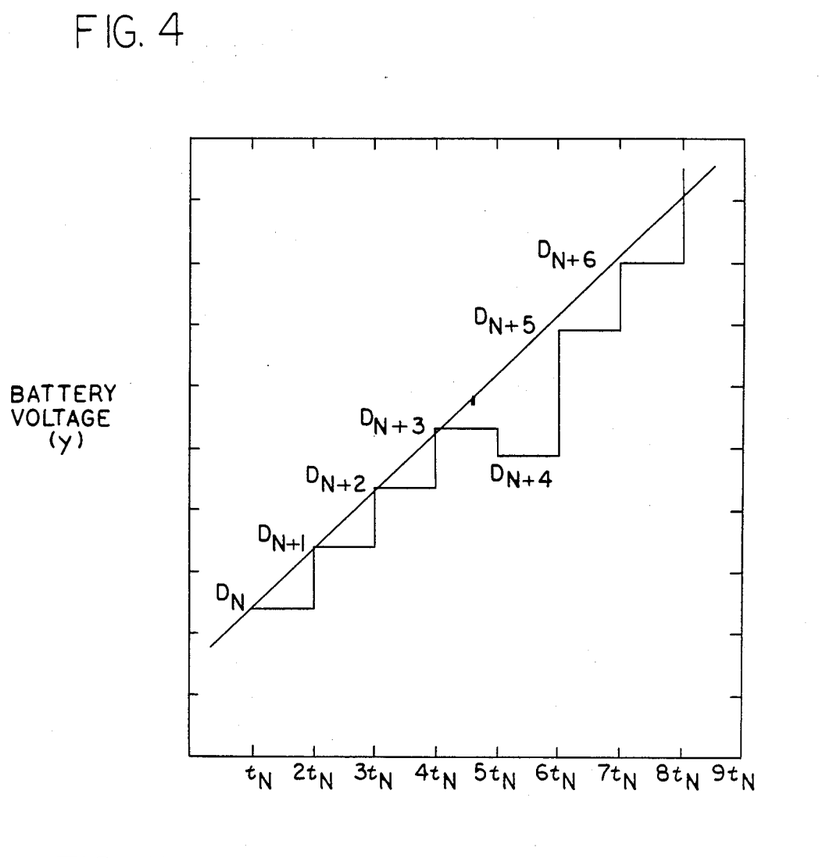
FIG. 4 is an expanded view of a battery voltage curve of the type shown in FIGS. 2a and 2b.

The preferred implementation of the controller is to use an analog-to-digital converter (ADC) in conjunction with a microcomputer. The microcomputer measures the battery voltage during each measurement window. Generation of the first derivative curve from the measured battery voltage is accomplished in a manner similar to the analog approach. i.e., $$\frac{(D_N - D_{N-1})}{\Delta t}$$

where $D_N$ and $D_{N-1}$ are the digital numbers representing the battery voltage from the present measurement window to the previous one and t is the time between measurement windows. Because the voltage change V from one measurement window to the next can be very small (3 mV), even a 16-bit ADC plots a "jagged" curve (see FIG. 4). To enhance the shape of this first derivative curve, a linear regression algorithm is used. Recalling that the first derivative of a curve is actually the slope of that curve, there is a way to find the best fit equation for any set of data points. This equation is composed of a slope and a y intercept, e.g., $y = mx + b$, where m is the slope and b is the y intercept. Since we are interested in the slope only, we need to compute only m, e.g., Linear regression curve fitting equation:

$$m = \frac{s\Sigma xy - \Sigma x \Sigma y}{s\Sigma x^2 - (\Sigma x)^2}$$

where s is the number of samples to be used and the preferred value for s is 11. So, in order to plot the first derivative curve, we use the following guidelines:

| First-Derivative Curve | | Battery-Voltage Curve |
|---|---|---|
| $FD_1$* | USE | $D_N$ to $D_{N+10}$ |
| $FD_2$* | USE | $D_{N+1}$ to $D_{N+11}$ |
| $FD_3$* | USE | $D_{N+2}$ to $D_{N+12}$ |

Figure 5:
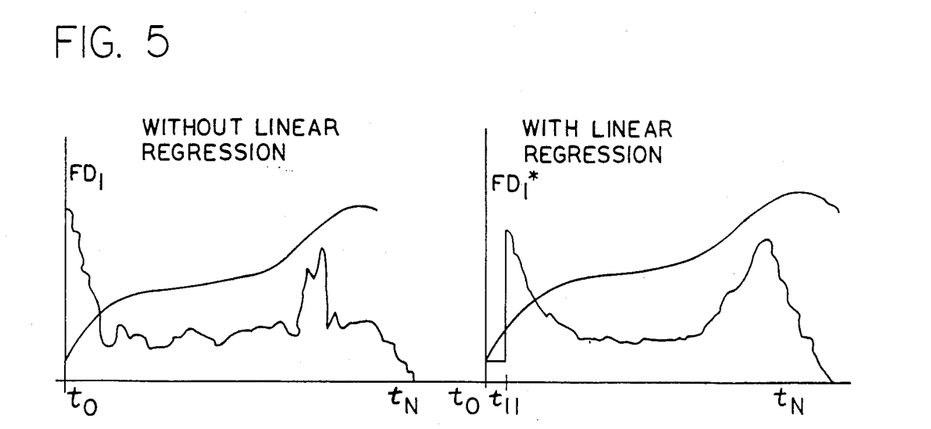
FIG. 5 shows two plots similar to those of FIG. 2a, with and without linear regression.

This linear regression technique implies that 11 points have been queued up. In reality, this means that the first 11 samples of the battery voltage curve do not generate a corresponding first derivative curve. But this typically represents only a small portion of the entire curve, so its effect are negligible, as illustrated in the two plots of FIG. 5.

Figure 6:
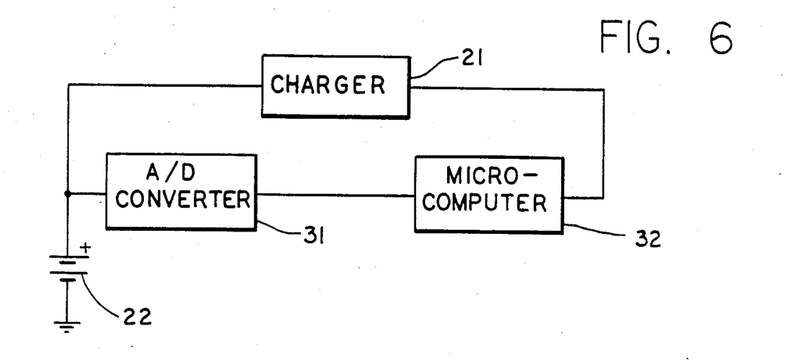
FIG. 6 is a block diagram of a digital controller for a battery charger and incorporating the presently preferred embodiment of the invention.
Figure 7:
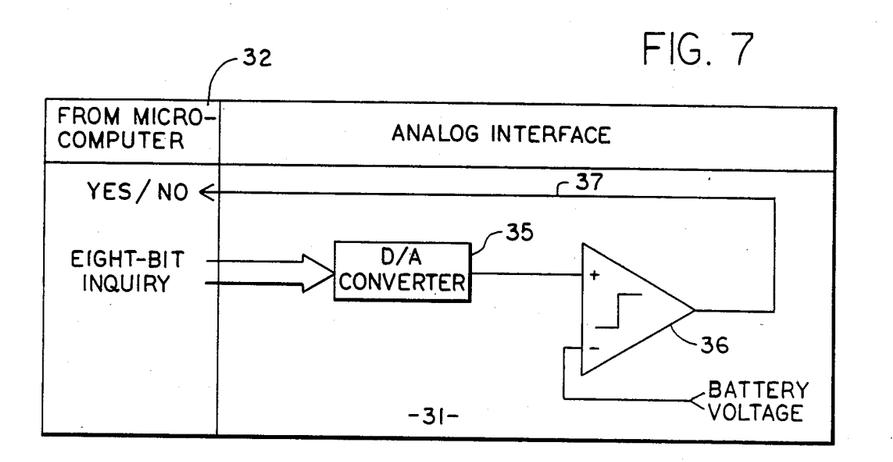
FIG. 7 is a diagram illustrating the analog-to-digital converter of FIG. 6 in greater detail.

As mentioned earlier, the microcomputer uses an ADC to measure the battery voltage. The implementation of this ADC is depicted in FIG. 6 with an analog-to-digital converter 31 and a microcomputer 32. A standard approach for analog-to-digital conversion (A/D) is to employ a digital-to-analog converter (DAC) 35 and compare its output to that to the battery 22 in a comparator 36, as shown in FIG. 7. An eight-bit "inquiry" is generated by the microcomputer 32. A YES/NO status line 37 tells the microcomputer that the digital number it generates is greater than the battery voltage. This is an iterative process, commonly called successive approximation. Since we are dealing with relatively small changes in battery voltage, a higher resolution ADC is desired.

Figure 8:
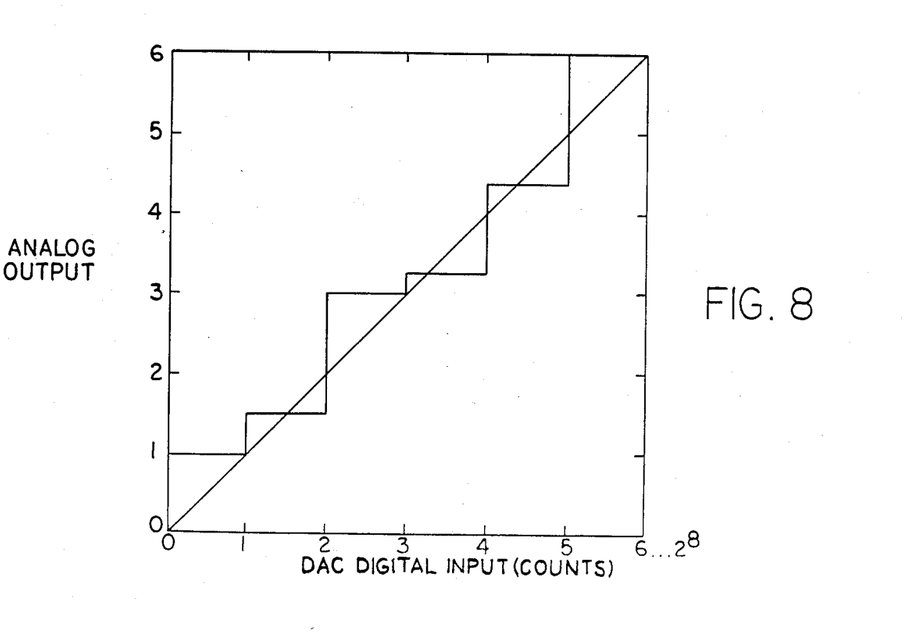
FIG. 8 is a diagram illustrating the operation of the digital-to-analog converter of FIG. 7.
Figure 9A:
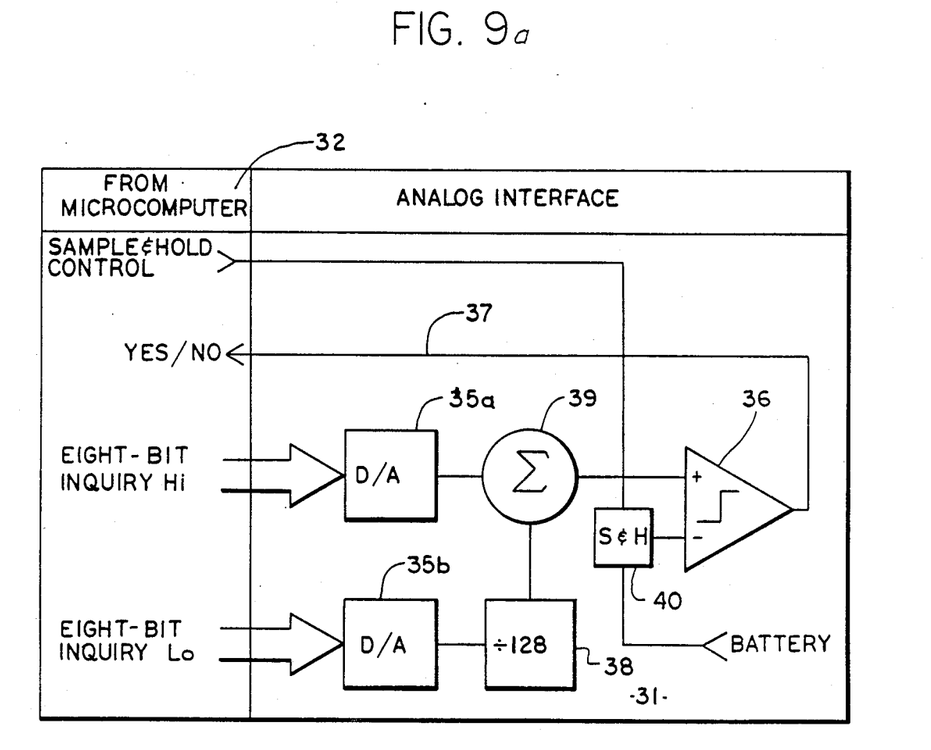
FIG. 9a is a block diagram illustrating the device of FIG. 7 in greater detail, with two digital to analog converters.
Figures 9B, 9C:
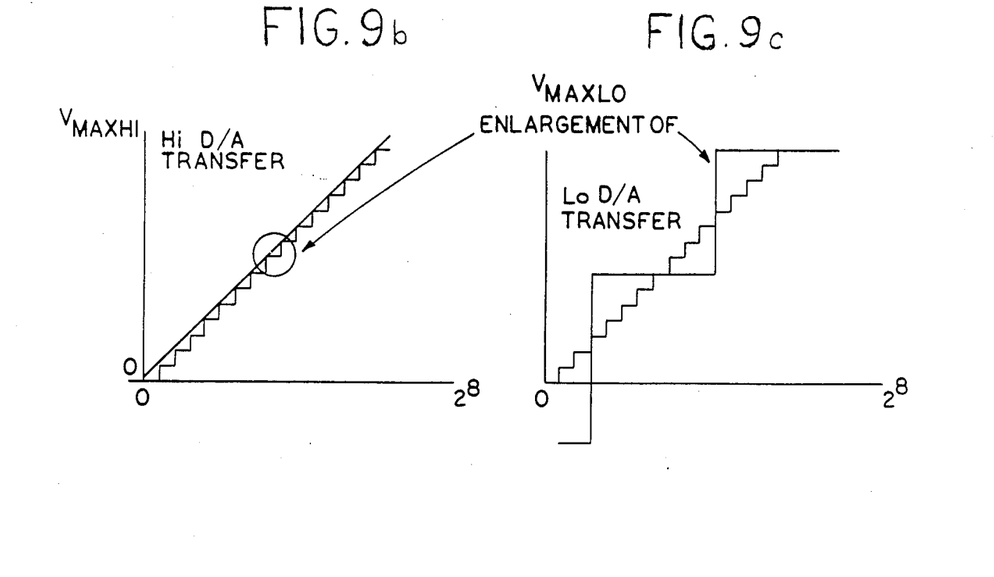
FIGS. 9b and 9c are diagrams illustrating the operation of the circuit of FIG. 9a, with FIG. 9c being an enlargement of a portion of FIG. 9b.

In the preferred embodiment a nonstandard approach was chosen, as shown in FIG. 9a. This circuit also includes a high DAC 35a and a low DAC 35b, a divider 38, a summer 39 and a sample and hold 40. By adding a second eight-bit DAC 35b and scaling it down such that its full range is twice the smallest change of the high DAC 35a, a fine resolving capacity exists. So, by first performing an eight-bit A/D conversion with the high eight-bit DAC 35a, then picking up the remainder using the lower eight-bit DAC 35b, we perform a coarse/fine approximation to the battery voltage which, in essence, gives us 16-bit resolving. However, a problem exists with this approach in that it assumes that each least significant bit (LSB) change if the high eight-bit DAC is equal, and this is not the case. In actuality, the transfer for an eight-bit DAC looks like the depiction in FIG. 8. In other words, we can no longer assume that the number represented by the coarse eight-bit D/A conversion is at all accurate in regards to the low eight-bit DAC quantity. However, if there was a way to measure and store each high DAC LSB change in units of low DAC quantities, this high LSB error could be eliminated. This error characterizing is performed by adding a new input CALIBRATE to another sample and hold 40b (see FIG. 10).

Figure 10:
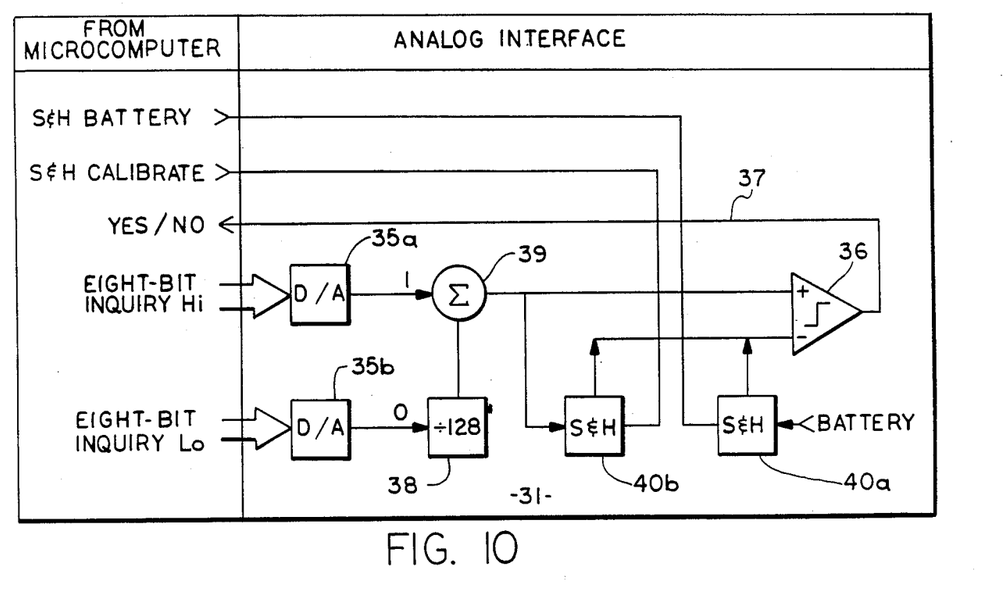
FIG. 10 is a diagram similar to those of FIGS. 6, 7 and 9, illustrating the preferred embodiment in greater detail.

The calibrate sequence proceeds as described in the following section. Referring to FIG. 10, the low eight-bit DAC 35b is at value 0 and the high eight-bit DAC 35a is at value 1. The battery S&H switch 40a is open during the entire calibration sequence. The calibration S&H switch 40b is momentarily closed, causing the (−) input to the comparator 36 to hold the HIDAC count 1 value. The HIDAC is returned to count zero. Now the LODAC is used to perform an A/D conversion for this HIDAC LSB quantity through the (+) input of the comparator. Once this value is found, it is stored in memory in location 1 of a table. We have just completed one of 256 calibration cycles.

Cycle 2 proceeds as follows. HIDAC count 2 is put into the S&H and this quantity is present at the (−) input of the comparator. The HIDAC is returned to state 1 and the LODAC is used to perform an A/D conversion for the HIDAC LSB 1-to-2 change. Once this value is found, it is stored in table location 2 in memory. This sequence is repeated for all HIDAC LSB changes.

Figure 11:
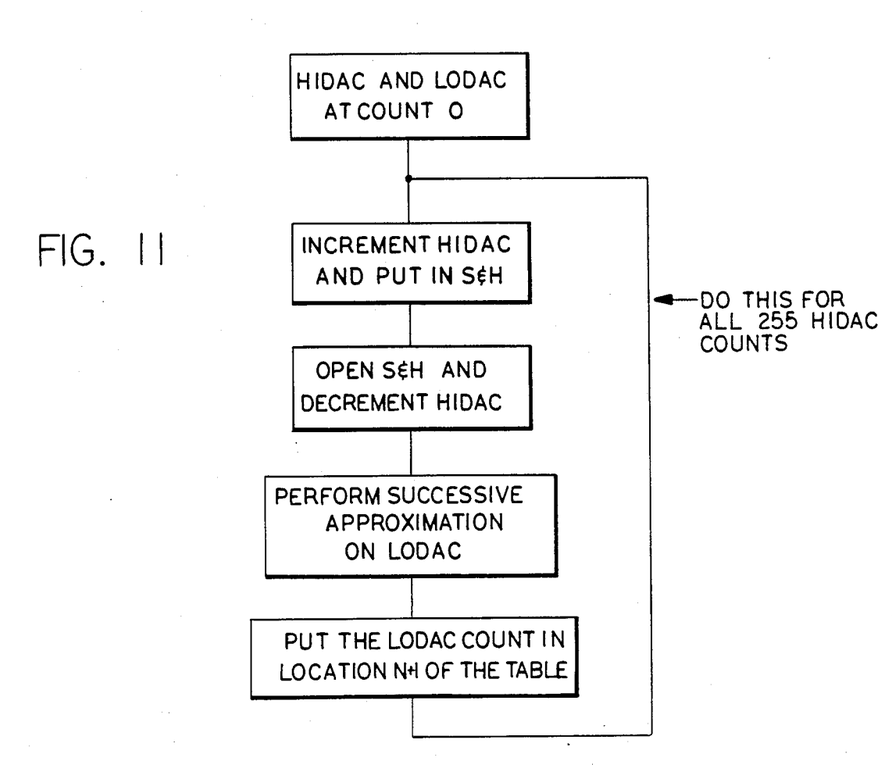
FIG. 11 is a flowchart for the operation of the device shown in FIG. 10.
Figure 12:
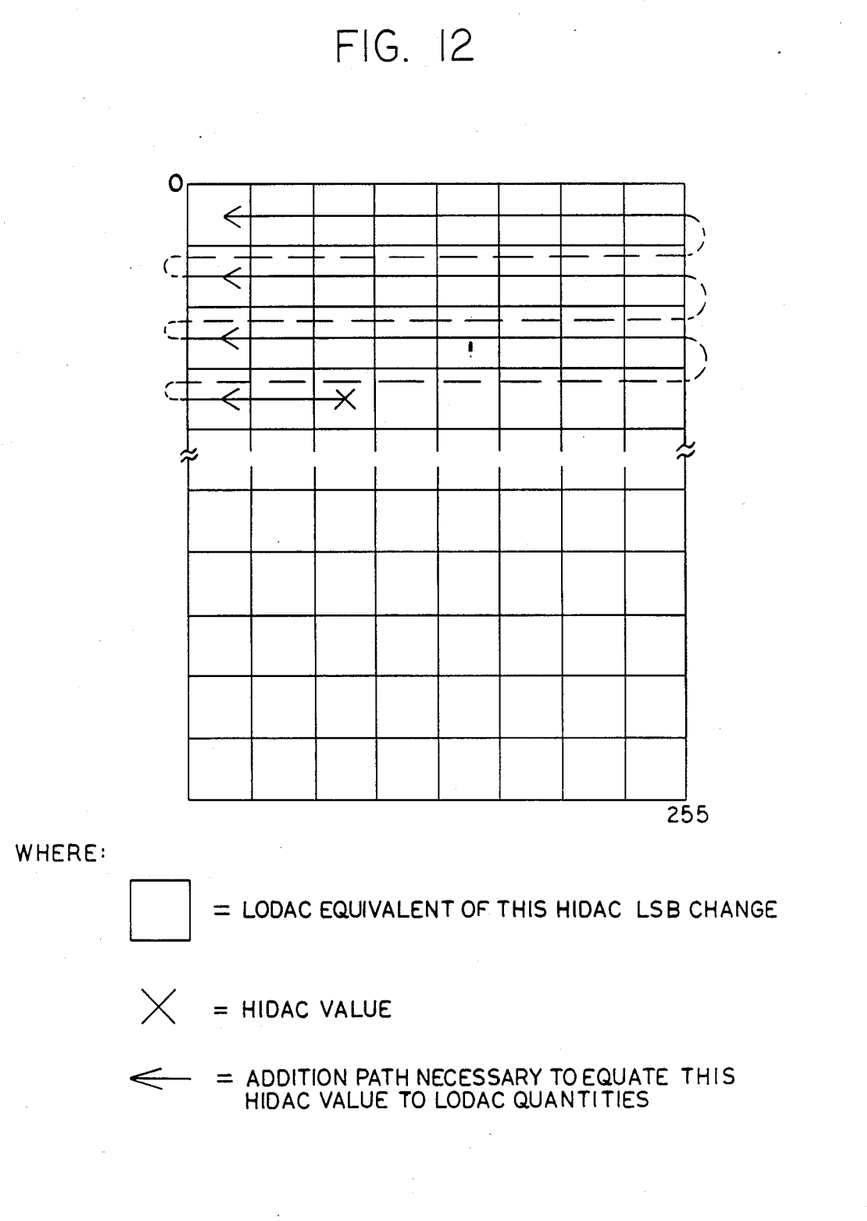
FIG. 12 is a conversion table illustrating the operation of the device depicted in FIG. 10.
Figure 13:
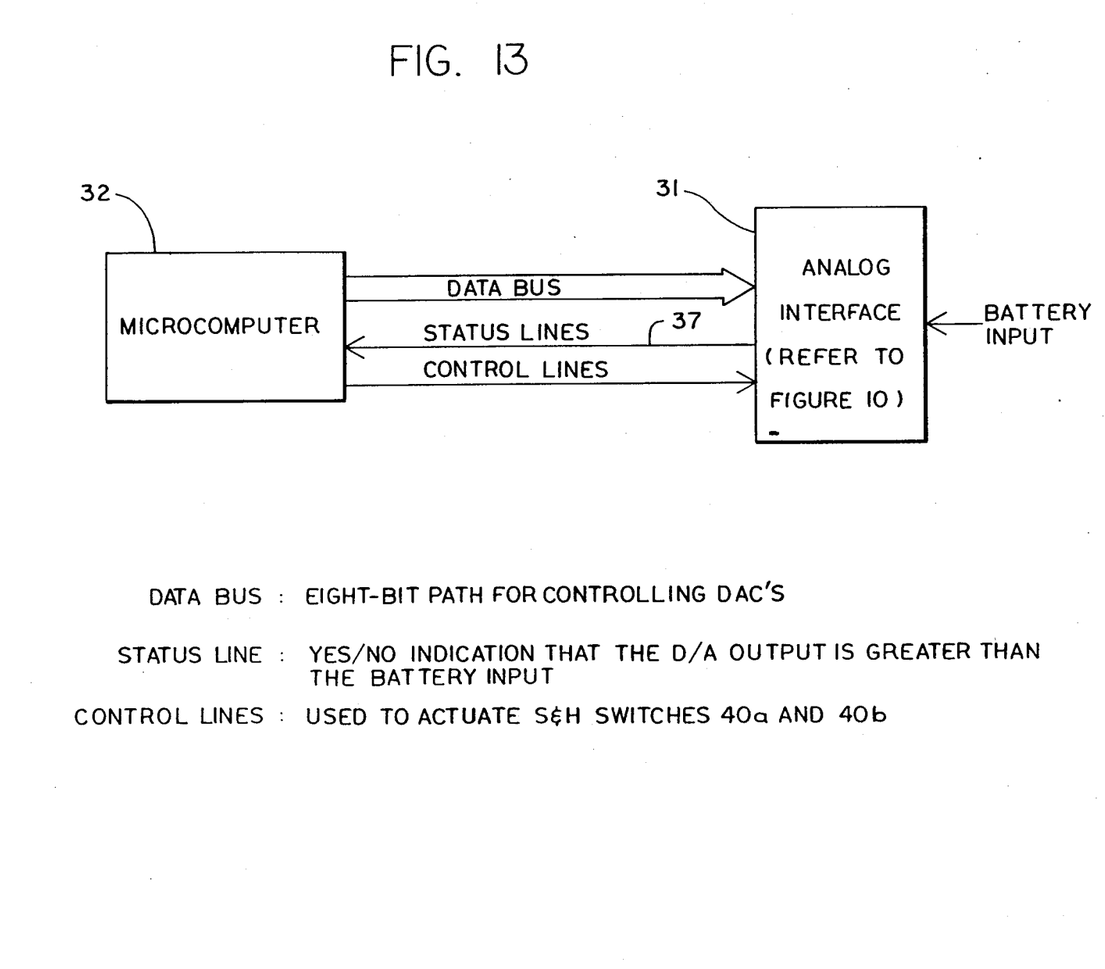
FIG. 13 is a diagram illustrating the interconnection of the device shown in FIG. 10.

The calibrate sequence can be summarized in a flowchart, as shown in FIG. 11. Once the HIDAC and LODAC values are found, the HIDAC must be converted using the LODAC equate table (refer to FIG. 12). FIG. 13 is the final A/D microcomputer interface block diagram.

Basically, the LODAC equate process uses the calibration table values generated during a previous calibration sequence. The HIDAC value is used as a table index. All LODAC table entries from the index back to zero are added. This resulting number is added to the eight-bit LODAC value measured during the A/D conversion process. The resulting number is a 16-bit representation of the battery voltage, i.e., $$D_N = \sum_{H}^{0} C_H + D_L$$

where $D_N$ is the 16-bit digital number representing the battery voltage, H is the eight-bit HIDAC value measured during A/D conversion, C is the calibration table value and $D_L$ is the eight-bit LODAC digital number measured during A/D conversion.

Cable ID System

Figure 14:
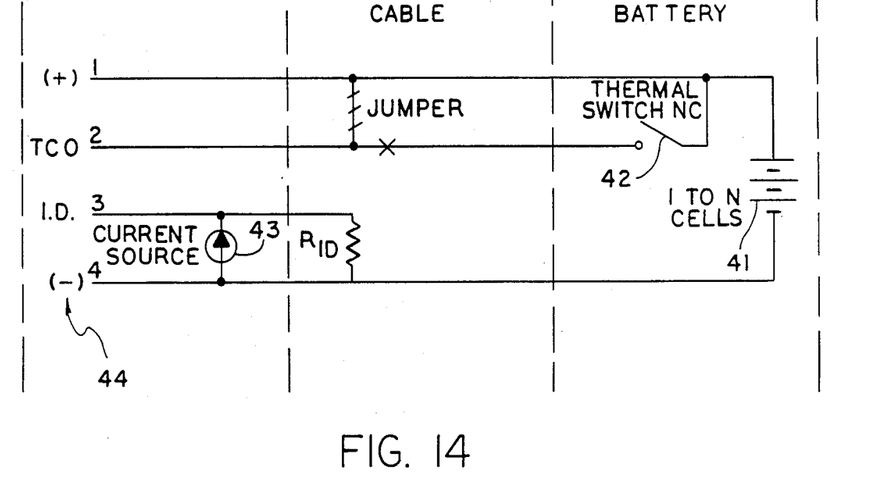
FIG. 14 is an electrical diagram of the battery cable connections for battery identification.

The circuit of FIG. 14 includes a battery 41, a normally closed thermal switch 42, an identification resistor $R_{ID}$, a current source 43, and a four pin connector 44 for interconnecting the battery and the charger and controller. The battery cable contains passive electronic components which are specially designed for use with battery identification techniques. The battery cable makes four connections to the controller and charger and two or three connections to the battery.

Pins 1 and 4 of the connector 44 are the power carrying conductors for the charge and discharge modes. Pin 3 is the battery ID sense pin.

Pin 2 is the temperature cutoff (TCO) pin. The pin informs the controller of the status of the TCO switch in the battery pack. On battery packs which do not have a temperature cutoff switch, pin 2 is jumpered to (+) pin 1 at the connector end of the cable. Depending on the type of battery pack connected, the TCO switch could be a primary or secondary charge cutoff.

The controller automatically identifies which battery pack is connected to the controller. An identification resistor $R_{ID}$, unique to this battery pack, is connected between pin 3 and ground.

In order to identify the type of battery connected, the microcomputer 32 applies a known current to pin 3. This current generates a voltage across $R_{ID}$, which voltage is then digitized. The raw digital number is processed and used to locate the parameter table for this type of battery, in a two step process using Tables 1 and 2 in FIGS. 18 and 19.

Figure 18:
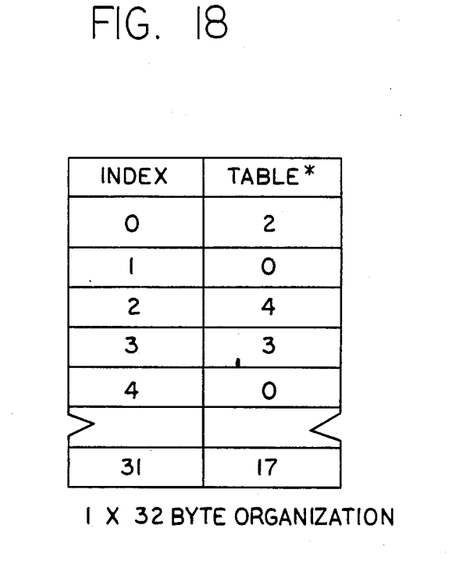
FIGS. 18 and 19 are Tables setting out the battery charging and discharging parameters.
Figure 19:
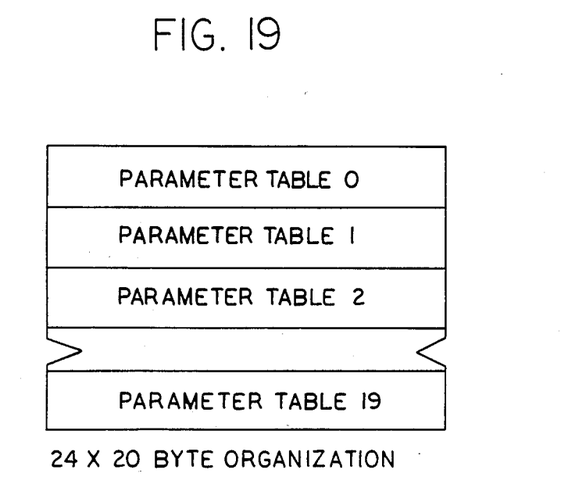

The raw digital number corresponding to the cable ID resistor voltage is translated into a table pointer via the parameter index table, FIG. 18, which table translates the raw digitized battery ID resistor voltage into a number that represents the actual parameter table, FIG. 19, for this battery. A side benefit of this table is to allow multiple battery types to utilize the same parameter table, thus obtaining more efficient use of memory resources. One commercial embodiment of the invention currently supports 32 battery types. Each of the parameter tables provides the information for a specific battery for use by the microcomputer in selecting data for the controller to determine the operating parameters such as charge and discharge time and currents.

The parameter tables are each 24 bytes long and are sequentially stored in memory. The information in these tables contain the actual battery charging and discharging parameters. The commercial embodiment currently uses 20 parameter tables, which correlates to 480 bytes. Both the parameter index table and the parameter tables (Tables 1 and 2) reside in RAM. Except for adding new cables, the parameter index tables should rarely need changing.

However, the parameter tables are much more likely to be changed due to reasons such as charge optimization, ampere hour calculations with different discharge currents, or different charging techniques (e.g., reflex or TCO). Because these values reside in nonvolatile RAM and are accessible through the keyboard of the microcomputer, these changes can be easily done in the field by the user.

In addition to determining battery types, the cable ID system is also used for special purpose cables. These cables have ID numbers outside the 32 types allocated for batteries. When these special purpose cables are connected, the microcomputer enables special modes of operation. Two such modes are the power supply mode and the discharger booster mode.

Figure 15:
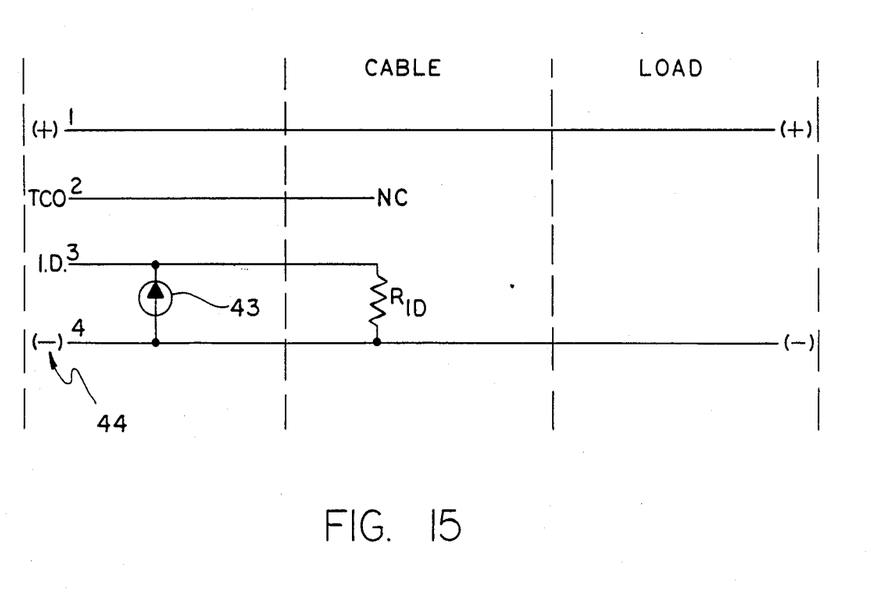
FIG. 15 is an electrical diagram of the cable connections for supplying power to a load.

The power supply mode variation of FIG. 14 is shown in FIG. 15 which provides for connections of various loads to pins 1 and 4. When placed in the power supply mode, the microcomputer first checks if any power supply cables are attached by looking at the cable ID pin 3, as previously described. If one is connected, this and any other channel that may have a power supply cable are energized. It may also be possible to have power supply cables that allow default values of power supply programming.

Figure 16:
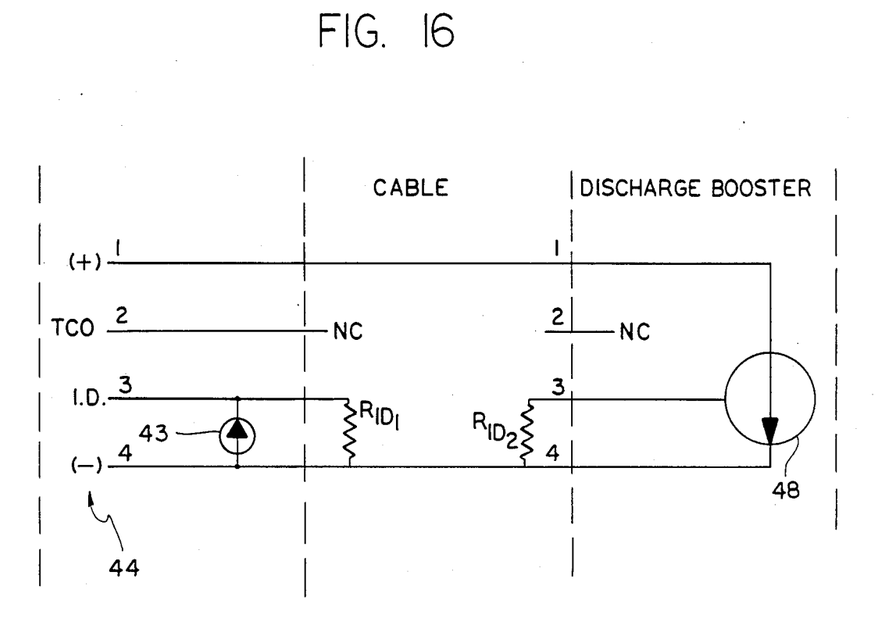
FIG. 16 is an electrical diagram of the cable connections for discharge booster operation.

The discharge booster mode variation of FIG. 14 is shown in FIG. 16. The discharge booster 48 may be used when the user specified discharge power level is in excess of the internal discharge safe operating area for the charger 21. If this is the case, the microcomputer looks to see if a discharge cable is connected to any channel. If so, it energizes this channel and recomputes its own internal discharge current such that the users' desired discharge current is generated. The discharge booster is a conventional unit also known as an electronic load, and can be used as a constant current load, for various purposes including testing of batteries. Typically a discharge booster includes an adjustable resistor which is set to have the booster draw a particular current. In the configuration of FIG. 16, this adjustable resistor is removed or disconnected, and the resistor $R_{ID2}$ serves as the current setting resistor. The discharge booster provides the current in the resistor $R_{ID2}$ to produce a voltage across that resistor, which voltage in turn tells the booster at what current to operate.

Because the controller is required to operate with different levels of discharge currents outside its own power capacity, the discharge booster must have some way of being informed regarding what current level to operate. This is accomplished by encoding the cable with an ID resistor at each end. At the connector end, the cable ID resistor $R_{ID1}$ tells the controller what discharge boost current is connected, and at the discharge booster end of the cable, the ID resistor $R_{ID2}$ tells the discharge booster at which discharge current to operate.

At the present time, three discharge boost cables are available—2, 4 and 6 amperes.

Since the booster can be connected to any channel, the controller has the ability to use multiple boosters. This is because current sinks in parallel add. At the present time, the hardware is limited to a total discharge of 14 amperes.

Determination of Different Charging Modes/Options Using Parameter Tables

Though the cable ID system is used with the parameter tables, it is possible to charge or discharge other than NICAD battery packs. This is because all the charging and discharging values, as well as the charging scheme and volts per cell, are encoded into the parameter tables.

Because of this facility, the controller can reconfigure itself from a constant current charging mode for NICAD, silver zinc and rechargable lithium batteries to a constant potential charger for lead acid, etc., batteries, almost any charging/discharging scheme for any battery type can be accomplished. This flexibility would not be possible without the parameter tables, and these tables are dependent on the cable ID system.

Within each mode of charging (constant potential or constant current) are various options which are also encoded into the parameter tables. In the constant current mode, such options include:
Reflex charging using first derivative cutoff
Reflex charging using negative slope cutoff
TCO cutoff
Timed cutoff charging
Voltage activated cutoff
In the constant potential mode, such options include:
Timed cutoff
Current activated cutoff

Detection of Abnormal Battery Conditions Using Parameter Tables

Figure 17:
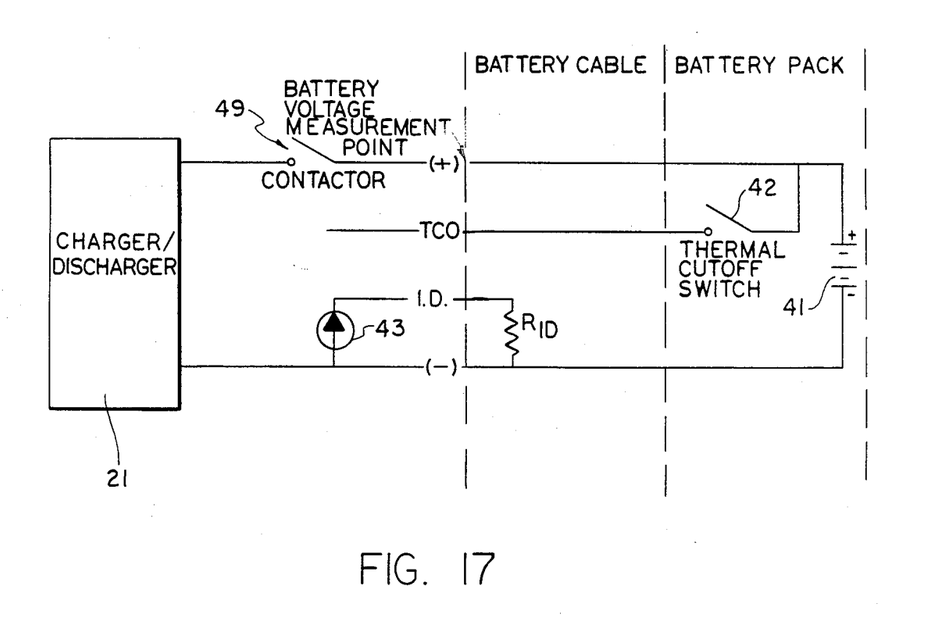
FIG. 17 is an electrical diagram showing the fault sensing area of controller.

Since the controller knows (via the cable ID technique) which type of battery is supposed to be connected to a given channel, it is possible to detect and display to the user the following fault conditions:
Reversed polarity battery pack
Abnormal battery temperature
Open battery pack
Shorted battery pack
Shorted cell in the battery pack
Wrong battery pack connected A simpled block diagram of hardware for fault sensing is depicted in FIG. 17, wherein a contactor 49 is set up in series between the positive output of the power section and the cable. During the charge or discharge cycle, this contactor is closed by the microcomputer. Prior to beginning a charge/discharge cycle, however, the microcomputer first checks the (+) pin before closing the contactor. If this voltage is negative, the charge/discharge cycle is aborted, the contactor remains open, and the reverse polarity error indication is generated.

On those batteries which contain a thermal cutoff switch, the controller is able to check the abnormally high battery temperatures prior to or during a charge/discharge cycle. If this switch opens, the controller puts the current cycle on hold and waits for the battery to cool. In the meantime, the on hold or over temperature error indication is generated.

Opens, shorts or wrong-type battery packs are detected using a test algorithm prior to or during a charge/discharge cycle. Since the controller knows which type of battery should be connected to a given channel, it can compare values stored in the parameter tables to those values generated during the test algorithm. This test is discussed in the following paragraphs.

Included in the parameter tables for the battery is a NUMBER OF CELLS parameter. Multiplying this by the VOLS PER CELL parameter gives a nominal battery voltage.

Prior to performing a charge/discharge cycle, the controller measures the battery voltage. If this voltage is zero or abnormally low, a determination must be made as to whether the battery is open, one or more cells have been shorted, the entire battery pack has shorted, or the battery is simply fully discharged. This is accomplished as follows.

Close the contactor and apply a charge current pulse for a brief time (10 amperes for 30 ms). Next, observe the battery voltage. If, at the end of the charge pulse time, the voltage is abnormally low, we have a shorted cell, or if the voltage is zero, we have a shorted battery pack. If the voltage goes well above the nominal battery voltage as defined in the parameter tables, we have an open battery or the wrong battery was connected.

However, if the battery voltage reaches the nominal battery voltage as calculated from the parameter tables, we can assume that the abnormally low voltage measured prior to the charge pulse was due to a fully discharged battery pack.

It must also be noted that, even if the battery voltage measured prior to applying the charge pulse was within the nominal battery voltage value from the parameter table, the test algorithm is still used to provide a final okay for the subsequent charge/discharge cycle.

I claim:

1. A controller for a battery charger, including in combination:
    a differential amplifier having first and second inputs and an output;
    a first sample and hold circuit having the battery voltage connected as an input and providing an output as one input to said differential amplifier;
    a second sample and hold circuit having the output of said first sample and hold circuit as an input and providing an output as the other input to said differential amplifier;
    an AND gate having first and second inputs and an output, with the AND gate output controlling the battery charger;
    a first slope detector having the output of said differential amplifier as an input and providing an output when a slope of a first sign is detected;
    a second slope detector having the output of said differential amplifier as an input and providing an output when a slope of the opposite sign is detected, with said second slope detector output connected as one input to said AND gate; and
    a latch circuit having the output of said first slope detector connected as input and providing an output as the other input to said AND gate.

2. A controller for a battery charger, including in combination:
    means for measuring the voltage of the battery to provide a measured voltage;
    an analog to digital converter for converting the measured voltage from an analog voltage to a digital voltage;
    means for computing a time derivative of said digital voltage and determining a change in slope of said time derivative; and
    means for shutting off the charger as a function of said change in slope; said analog to digital converter including
    a comparator having first and second inputs,
    a summing circuit having first and second inputs, and an output connected as one input to said comparator,
    a first digital to analog converter having an output connected as one input to said summing circuit,
    a second digital to analog converter,
    a divider circuit having as an input, the output of said second digital to analog converter, with the divider circuit output connected as the other input to said summing circuit, and
    a sample and hold circuit having the battery voltage connected as an input and having an output connected as the other input to said comparator.

3. A controller as defined in claim 2 for use with a battery having an identification resistor, including:
    means for providing an electrical current of known value in said resistor;
    means for measuring the voltage developed across said resistor by said current; and
    means for relating the measured voltage to a predetermined battery identification.

4. A controller for a battery charger for use with a battery having an identification resistor, wherein the battery charger operates in a three step sequence consisting of a charging pulse for a first time period, a discharging pulse for a second time period, and no pulse for a third time period, including in combination:
    means for measuring the voltage of the battery during said third time period to provide a measured voltage;
    an analog to digital converter for converting the measured voltage from an analog voltage to a digital voltage;
    means for computing a time derivative of said digital voltage and determining a change in slope of said time derivative;
    means for shutting off the charger as a function of said change in slope;
    means for providing an electrical current of known value in said resistor;
    means for measuring the voltage developed across said resistor by said current; and
    means for relating the measured voltage to a predetermined battery identification, said means for relating including:
    a memory;
    means for converting the measured voltage to a number; and
    means for looking up in said memory a battery identification corresponding to said number.

5. A controller for a battery charger wherein the battery charger operates in a three step sequence consisting of a charging pulse for a first time period, a discharging pulse for a second time period, and no pulse for a third time period, including in combination:
    means for measuring the voltage of the battery during said third time period to provide a measured voltage;
    an analog to digital converter for converting the measured voltage from an analog voltage to a digital voltage;
    means for computing a time derivative of said digital voltage and determining a change in slope of said time derivative;
    means for shutting off the charger as a function of said change in slope;
    a first battery identification resistor;

a current source of known value;

first circuit means for connecting said current source across said first resistor to provide a first voltage across said first resistor;

a set of parameter tables stored in memory;

an index table stored in memory, said index table including an index relating voltage numbers and parameter tables; and means for selecting a parameter table as a function of said first voltage across said first resistor.

6. A controller for a battery charger for use with a battery discharge booster having a current source, wherein the battery charger operates in a three step sequence consisting of a charging pulse for a first time period, a discharging pulse for a second time period, and no pulse for a third time period, including in combination:

means for measuring the voltage of the battery during said third time period to provide a measured voltage;

an analog to digital converter for converting the measured voltage from an analog voltage to a digital voltage;

means for computing a time derivative of said digital voltage and determining a change in slope of said time derivative;

means for shutting off the charger as a function of said change in slope;

a discharge current resistor; and circuit means for connecting said resistor to the current source of the battery discharge booster.

7. A method for controlling a battery charger and identifying a battery to be charged prior to initiating the charging, including the steps of:

measuring the voltage produced across a resistor by a known current, which resistor is associated with a specific battery;

converting the measured voltage to a number;

looking up the number in a table in a charger memory to relate the measured voltage with the specific battery;

operating the charger in a continuously repeating three step sequence consisting of a charging pulse for a first time period, a discharging pulse for a second time period, and no pulse for a third time period;

measuring the voltage of the battery during said third time period to provide a measured voltage;

determining a time derivative of said measured voltage to provide a voltage derivative;

determining a change in slope of said voltage derivative; and shutting off the charger as a function of said change in slope.

* * * * *